US007283964B1

(12) United States Patent
Geilhufe et al.

(10) Patent No.: US 7,283,964 B1
(45) Date of Patent: Oct. 16, 2007

(54) METHOD AND APPARATUS FOR VOICE CONTROLLED DEVICES WITH IMPROVED PHRASE STORAGE, USE, CONVERSION, TRANSFER, AND RECOGNITION

(75) Inventors: Michael Geilhufe, Palo Alto, CA (US); Phillip Paul Pyo, San Jose, CA (US); Avraham Barel, Doar na shimshon (IL); Amos Brown, Givat smmuhel (IL); Karin Lissette Bootsma, San Jose, CA (US); Lawrence Kent Gaddy, San Jose, CA (US); David MacMillan, Woodside, CA (US)

(73) Assignee: Winbond Electronics Corporation, Hsinchu (TW)

( * ) Notice: Subject to any disclaimer, the term of this patent is extended or adjusted under 35 U.S.C. 154(b) by 0 days.

(21) Appl. No.: 09/567,858

(22) Filed: May 9, 2000

Related U.S. Application Data

(60) Provisional application No. 60/135,301, filed on May 21, 1999.

(51) Int. Cl.
*G10L 21/00* (2006.01)
(52) U.S. Cl. ...................... 704/277; 704/251
(58) Field of Classification Search ................ 704/270, 704/251, 255, 277
See application file for complete search history.

(56) References Cited

U.S. PATENT DOCUMENTS

| 4,158,750 A | 6/1979 | Sakoe et al. ............... 179/1 SD |
| 4,481,593 A | 11/1984 | Bahler ..................... 364/513.5 |
| 4,520,576 A | 6/1985 | Vander Molen |
| 4,556,944 A | 12/1985 | Daniels et al. |
| 4,644,107 A | 2/1987 | Clowes et al. |
| 4,731,811 A | 3/1988 | Dubus |
| 4,737,976 A | 4/1988 | Borth et al. |
| 4,797,924 A | 1/1989 | Schnars et al. ............... 381/43 |
| 4,853,953 A | 8/1989 | Fujisaki |
| 4,857,030 A | 8/1989 | Rose |
| 4,882,685 A | 11/1989 | van der Lely |
| 4,928,302 A | 5/1990 | Kaneuchi et al. |
| 4,961,212 A | 10/1990 | Marui et al. |

(Continued)

FOREIGN PATENT DOCUMENTS

EP 0 238 695 A1 3/1986

(Continued)

OTHER PUBLICATIONS

Balentine, et al., Debouncing the Speech Button: A Sliding Capture Window Device for Synchronizing Turn-Taking, International Journal of Speech Technology 2, May 28, 1996, pp. 7-19 (1997), Kluwer Academic Publishers, The Netherlands.

(Continued)

*Primary Examiner*—Michael N Opsasnick
(74) *Attorney, Agent, or Firm*—Blakely, Sokoloff, Taylor & Zafman LLP

(57) ABSTRACT

The embodiments of the invention provide for the storage of speech phrases. Speech phrases are processed by a speaker-independent speech recognition engine of a voice controlled device. This engine returns a speaker-independent representation of the phrase. The speaker-independent representation is stored. Embodiments of the invention include methods of converting text to speaker-independent representations of speech and speaker-independent representations of speech into text.

37 Claims, 6 Drawing Sheets

U.S. PATENT DOCUMENTS

| | | | |
|---|---|---|---|
| 5,007,081 A | 4/1991 | Schmuckal et al. | |
| 5,020,107 A | 5/1991 | Rohani et al. | |
| 5,042,063 A | 8/1991 | Sakanishi et al. | |
| 5,054,082 A | 10/1991 | Smith et al. | |
| 5,117,460 A | 5/1992 | Berry et al. | |
| 5,165,095 A | 11/1992 | Borcherding | |
| 5,222,121 A | 6/1993 | Shimada | |
| 5,369,685 A | 11/1994 | Kero | |
| 5,406,618 A | 4/1995 | Knuth et al. | |
| 5,452,340 A | 9/1995 | Engelbeck et al. | |
| 5,457,769 A | 10/1995 | Valley | |
| 5,566,272 A | 10/1996 | Brems et al. | |
| 5,602,963 A | 2/1997 | Bissonnette et al. | |
| 5,652,789 A | 7/1997 | Miner et al. | |
| 5,659,597 A | 8/1997 | Bareis et al. | |
| 5,659,662 A * | 8/1997 | Wilcox et al. | 704/245 |
| 5,685,000 A | 11/1997 | Cox, Jr. | |
| 5,752,232 A | 5/1998 | Basore et al. | |
| 5,774,841 A | 6/1998 | Salazar et al. | |
| 5,777,571 A | 7/1998 | Chuang | |
| 5,794,204 A | 8/1998 | Miyazawa et al. | |
| 5,799,065 A | 8/1998 | Junqua et al. | |
| 5,805,672 A | 9/1998 | Barkat et al. | |
| 5,842,165 A * | 11/1998 | Raman et al. | 704/255 |
| 5,842,168 A | 11/1998 | Miyazawa et al. | |
| 5,867,574 A | 2/1999 | Eryilmaz | |
| 5,874,939 A | 2/1999 | Galvin | |
| 5,878,394 A | 3/1999 | Muhling | |
| 5,884,265 A | 3/1999 | Squitteri et al. | |
| 5,895,447 A | 4/1999 | Ittycheriah et al. | |
| 5,895,448 A * | 4/1999 | Vysotsky et al. | 704/270.1 |
| 5,924,070 A | 7/1999 | Ittycheriah et al. | 704/275 |
| 5,983,187 A * | 11/1999 | Haddock | 704/275 |
| 5,983,190 A * | 11/1999 | Trower et al. | 704/276 |
| 5,995,928 A * | 11/1999 | Nguyen et al. | 704/251 |
| 6,014,626 A | 1/2000 | Cohen | |
| 6,052,666 A | 4/2000 | Diehl et al. | 704/275 |
| 6,076,054 A * | 6/2000 | Vysotsky et al. | 704/240 |
| 6,094,632 A * | 7/2000 | Hattori | 704/239 |
| 6,119,088 A | 9/2000 | Ciluffo | 704/275 |
| 6,173,266 B1 * | 1/2001 | Marx et al. | 704/270 |
| 6,192,339 B1 | 2/2001 | Cox | |
| 6,223,155 B1 * | 4/2001 | Bayya | 704/243 |
| 6,363,411 B1 | 3/2002 | Dugan et al. | |
| 6,408,272 B1 * | 6/2002 | White et al. | 704/270.1 |
| 6,470,315 B1 * | 10/2002 | Netsch et al. | 704/256 |
| 6,606,598 B1 * | 8/2003 | Holthouse et al. | 704/275 |
| 6,665,640 B1 * | 12/2003 | Bennett et al. | 704/257 |
| 6,687,339 B2 * | 2/2004 | Martin | 379/88.14 |

FOREIGN PATENT DOCUMENTS

| | | |
|---|---|---|
| EP | 0 618 710 A2 | 3/1994 |
| EP | 0 700 031 A1 | 8/1995 |
| EP | 0 730 261 | 4/1996 |
| EP | 0 739 121 A2 | 4/1996 |
| EP | 0 810 502 | 3/1997 |
| EP | 0 854 417 A2 | 1/1998 |
| EP | 0 867 860 A2 | 3/1998 |
| EP | 0 911 808 | 4/1999 |
| WO | WO98 09265 | 3/1998 |
| WO | WO98 55992 | 12/1998 |
| WO | WO99/05671 | 2/1999 |
| WO | WO99 05671 | 2/1999 |
| WO | WO99/08084 | 2/1999 |
| WO | WO99/14928 | 3/1999 |

OTHER PUBLICATIONS

Balentine, et al., Goal-Orientation and Adaptivity in a Spoken Human Interface, Journal of the American Voice I/O Society, San Jose, California, Feb. 1992.

Balentine, A Multimedia Interface: Speech, Sound, Sight and Touch, A VIOS '94 Proceedings, American Voice Input/Output Society, San Jose, California, Sep. 1994.

Zhu, et al., An Automated NC Programming system in integrated CAD/CAM, ICAS, Congress, 18th, Beijing, China, Sep. 20-25, 1992, Proceedings, vol. 2 (A93-14151 03-01), American Institute of Aeronautics and Astronautics, Inc., Washington.

Rolwing, Phones Heading Backward to Future, Arizona Republic, Feb. 5, 1999, newspaper article, Arizona.

PR NEWSWIRE, NetSage Merges with FunArts: Nass and Reeves of Stanford University Join with Combined Company to Lead Social Interface Market, San Francisco, California, Oct. 20, 1998.

Automatic ID News, New Mobile Computing Company offers Pen-Based Terminal, Jan. 1999, Automatic I.D. News, vol. 15, No. 1, United States.

Newsbytes News Network, Telecom Trials Portico Voice User Interface, Newsbytes news Network, May 6, 1998, United States.

RCR Radio Communications Report, General magic unviels voice platform, RCR Radio Communications Report, vol. 17, No. 15, Apr. 13, 1998, United States.

Computergram International, General Magic Demonstrates New Voice Agents, Computergram International, Apr. 13, 1999.

Computergram International, General Magic Bags Another $35M, Computergram International, Jun. 26, 1998.

Computergram International, General Magic Goes Back to Its Roots with New Handheld, Computergram International, Jun. 23, 1998.

Military & Aerospace Electronics, Wearable Computers Could Revolutionize Military Maintenance and Inspection, Military & Aerospace Electronics, Nov. 1995, 3 pages.

Gohring, Hello! Welcome to Portico . . ., Telephony, vol. 234, No. 20, May 18, 1995, 1 page.

Bernstein, Could this Be Magic?, Telephony, Apr. 6, 1998, vol. 234, No. 14, 1 page.

Barchard, Natural Language Modernizes the Call Center, Telemarketing and Call Center Solutions, vol. 16, No. 3, Sep. 1997, 6 pages.

Stevens, Are You Ready for the Desktop of the Future?, Datamation, vol. 40, No. 11, Jun. 1, 1994, 4 pages.

Meisel, Straight Talk about Speech Recognition [voice user interfaces], Business Communications Review, vol. 26, No. 8, Aug. 1996, 5 pages.

Business Wire, Genenral Magic Secures Additional Financing; Company Obtains $20 Million to Further Voice-Enabled Services, Predicasts, Mar. 31, 1991.

PR NEWSWIRE, The Nation's First Free Voicemail Service Set for April Launch, PR Newswire, Mar. 31, 1991.

Business Wire, Telephone Speech Recognition Technology will Impact E-commerce, Business Wire, Feb. 22, 1999.

Business Wire, General Magic Selects Speech-Activated Technology from Speech Works; Business Wire, Jan. 19, 1999.

PR NEWSWIRE, Voice Control Systems' Award-Winning Speechwave(TM) Successfully Deployed in Key Worldwide Accounts, PR Newswire, Jan. 14, 1999.

Business Wire, General Magic to Demonstrate Portico-Enabled Auto PC at CES; Business Wire, Jan. 7, 1999.

Business Wire, General Magic Announces Web Sign-up for the Portico Virtual Assistant Service, Business Wire, Dec. 28, 1998.

Business Wire, General Magic Awarded New Innovator Award; magicTalk Honored for Excellence in Integrated Voice/Data Technology, Business Wire, Dec. 21, 1998.

Business Wire, InTouch Systems Announces Inflection 3.0; Business Wire, Dec. 21, 1998.

Business Wire, Telephone Speech Recognition May Grow Faster Than the Internet; New Summit Conference draws Technology Leaders, Business Wire, Dec. 18, 1998.

Business Wire, General Magic Announces NeTalk Acquisition; Patent-Pending Technology to Further Advancement of magicTalk Platform, Business Wire, Nov. 24, 1998.

PR Newswire, Xybernaut Corporation (NASDAQ) and JAE Launch New Wearable Flat Panel Display at COMDEX in Las Vegas, PR Newswire, Nov. 19, 1998.

Business Wire, General Magic Announces Exclusive Agreement with Intuit, Business Wire, Nov. 9, 1998.

Business Wire, General Magic's DataRover Division to Become Independent Enterprise; General Magic will Focus Efforts on Expansion of the Portico Service and Development of magicTalk, Business Wire, Oct. 28, 1998.

PR NEWSWIRE, NetSage Merges with FunArts; Nass and Reeves of Stanford University Join with Combined Company to Lead Social Interface Market, PR Newswire, Oct. 20, 1998.

Business Wire, General Magic Launches Major Marketing Campaign for National Debut of Portico Service, Business Wire, Sep. 21, 1998.

Business Wire, General Magic Announces Commercial Release of the Portico Virtual Assistant Service Company Achieves Strategic Milestone, Business Wire, Jul. 30, 1998.

Business Wire, ISD Receives Exclusive Rights to Embed Conversa's Continuous-Speech Recognition Software in Semiconductor Applications, Business Wire, Jul. 23, 1998.

PR NEWSWIRE, U.S. Computer Group Selects Xybernaut® Wearable Computers for Support of its Computer Field Service Personnel, PR Newswire, Jul. 15, 1998.

Business Wire, General Magic Partners with Leading Authorities to Instill magicTalk with Humanlike Personality, Business Wire, Jun. 15, 1998.

Business Wire, US Computer Group Secures Strategic Agreement with Xybernaut Corp., Business Wire, Jul. 13, 1998.

Business Wire, General Magic in Beta Testing of its Portico Virtual Assistant Service, Business Wire, Jul. 8, 1998.

Business Wire, Saatchi & Saatchi Performs Magic; Business Wire, Jul. 6, 1998.

Business Wire, General Magic Secures $35 Million in Added Financing, Business Wire, Jun. 25, 1998.

PR NEWSWIRE, Xybernaut Announces New Wearable Computer at International Conference, PR Newswire, Jun. 2, 1998.

PR NEWSWIRE, Voice Diary Ltd. Presents at TechVentures: Santa Clara, PR Newswire, May 28, 1998.

PR NEWSWIRE, Sony Digital Products President Finalizes Deal to Manufacture Xybernaut's® Mobile Assistant IV® Wearable Computer, PR Newswire, May 13, 1998.

Business Wire, General Magic Announces Reseller Channel Strategy for New Portico Virtual Assistant, Business Wire, May 5, 1998.

Business Wire, Top Telecommunications Companies to Trial Portico Service for General Magic; Extended Trials Begin in Next 30 Days, Business Wire, May 5, 1998.

Business Wire, General Magic and Encanto Networks Demonstrate Voice-Based E-Commerce Application, Business Wire, Dec. 10, 1997.

Business Wire, General Magic gives first look at future of mobile business communications, Business Wire, Apr. 28, 1997.

Business Wire, Handwriting and Speech Recognition Announced for Memos Open Operating Environment, Business Wire, Sep. 24, 1996.

PR NEWSWIRE, J. Robin Rohlicek Joins Purespeech as Vice President of Engineering, PR Newswire, Nov. 28, 1995.

Telephone IP News, General Magic Begins Web Sign-Up for Virtual Assistant Service, Telephone IP News, May, 1999.

Audiotex Update, General Magic Acquires Netalk, Audiotex Update, Jan. 1999.

Audiotex Update, "Portico" Enables Mobile Users to Access Info Via Phone, Audiotex Update, Oct. 1, 1998.

Audiotex Update, ISD Gets Exclusive Rights to Embed Conversa Technology, Audiotex Update, Sep. 1, 1998.

Telephone IP News, General Magic Signs PC Quote to Deliver Stock Market Data, Telephone IP News, Aug. 1, 1998.

Network Briefing, Finance: General Magic Bags Another $35M, Network Briefing, Jun. 26, 1998.

Network Briefing, Datacoms: General Magic Goes Back to Its Roots with New Handheld, Network Briefing, Jun. 23, 1998.

Audiotex Update, Unisys and Parity Create Spoken Language Environment for IVR, Audiotex Update, Apr. 1, 1998.

Network Briefing, Finance: Microsoft Invests in General Magic, Gets Hands on Serengeti, Network Briefing, Mar. 5, 1998.

Work-Group Computing Report, Voice Processing: General Magic and Encanto Netowrks Demonstrate Voice-Based E-Commerce Application, Dec. 15, 1997.

Telemedia News & Views, A Flood of Universal Mailboxes, Telemedia News & Views, Aug. 1, 1998.

Business Wire, General Magic Names James McCormick Chief Operating Officer, Business Wire, Mar. 23, 1999.

Business Wire, General Magic Announces Fourth Quarter and Year-End 1998 Results, Business Wire, Mar. 10, 1999.

PR NEWSWIRE, NetSage Showcases Social Intelligence Server for Relationship Management, Pr Newswire, Feb. 11, 1999.

PR NEWSWIRE, NetSage Unveils Social Intelligence Server that Personalizes Online and Automated Voice Experiences, Feb. 8, 1999.

Business Wire, Wireless Knowledge and General Magic Plan to Add Voice-Enabling Capabilities to Revolv, Feb. 8, 1999.

Computergram International, General Magic Spins Off Datarover Handheld Division, Computergram International, Oct. 30, 1998.

Business Wire, General Magic Announces MagicTalk, the First Intelligent Voice User Interface Platform, Business Wire, Apr. 9, 1998.

Computergram International, Microsoft Invests in General Magic, Gets Hands on Serengeti, Computergram International, Mar. 5, 1998.

Business Wire, General Magic Announces Serengeti Field Test Completion and Continued Momentum Toward Next Milestone, Business Wire, Sep. 23, 1997.

Network Computing, Enter The Odyssey, Network Computing, Jul. 15, 1997.

Network Computing, Enter The Odyssey: Telescript mobile agent system, Network Computing, Jul. 1, 1997.

Business Wire, Unisys announcing major enhancements to natural Language Assistant, Business Wire, Apr. 15, 1997.

PR NEWSWIRE, PureSpeech Demonstrates Virtual Voice Assistant for PC Telephony Using Intel's MMX Technology, PR Newswire, Sep. 17, 1996.

PR NEWSWIRE, PureSpeech Raises $4.3 Million in Venture Capital Financing, PR Newswire, May 7, 1996.

Business Wire, Harris & Harris Group Increases Investment in PureSpeech, Business Wire, May 7, 1996.

Apple Website, Dragon Systems Brings Speech Recognition Software to the Macintosh, Apple Computer, Inc.

* cited by examiner

METHOD AND APPARATUS FOR VOICE CONTROLLED DEVICES WITH IMPROVED PHRASE STORAGE, USE, CONVERSION, TRANSFER, AND RECOGNITION

CROSS-REFERENCES TO RELATED APPLICATIONS

This non-provisional United States (US) patent application claims the benefit of U.S. Provisional Application No. 60/135,301 filed on May 21, 1999 by inventors GEILHUFE et al.

This application is related to U.S. patent application Ser. No. 09/316,332, pending, filed by inventors GEILHUFE et al, entitled "METHOD AND APPARATUS FOR STANDARD VOICE USER INTERFACE AND VOICE CONTROLLED DEVICES" and to be assigned to Information Storage Devices, Inc. the disclosure of which is hereby incorporated by reference, verbatim and with the same effect as though it were fully and completely set forth herein.

This application is also related to U.S. patent application Ser. No. 09/316,643, now issued as U.S. Pat. No. 6,584,439, filed by inventors GEILHUFE et al, entitled "METHOD AND APPARATUS FOR CONTROLLING VOICE CONTROLLED DEVICES" and to be assigned to Information Storage Devices, Inc. the disclosure of which is hereby incorporated by reference, verbatim and with the same effect as though it were fully and completely set forth herein.

This application is also related to U.S. patent application Ser. No. 09/316,604, now abandoned, filed by inventors GEILHUFE et al, entitled "METHOD AND APPARATUS FOR ENHANCING ACTIVATION OF VOICE CONTROLLED DEVICES" and to be assigned to Information Storage Devices, Inc. the disclosure of which is hereby incorporated by reference, verbatim and with the same effect as though it were fully and completely set forth herein.

This application is also related to U.S. patent application Ser. No. 09/316,334, filed by inventors GEILHUFE et al, now abandoned, entitled "METHOD AND APPARATUS FOR IDENTIFYING VOICE CONTROLLED DEVICES" and to be assigned to Information Storage Devices, Inc. the disclosure of which is hereby incorporated by reference, verbatim and with the same effect as though it were fully and completely set forth herein.

This application is also related to U.S. patent application Ser. No. 09/316,666, filed by inventors GEILHUFE et al, now abandoned, entitled "METHOD AND APPARATUS FOR MACHINE TO MACHINE COMMUNICATION USING SPEECH" and to be assigned to Information Storage Devices, Inc. the disclosure of which is hereby incorporated by reference, verbatim and with the same effect as though it were fully and completely set forth herein.

To the extent that a conflict arises through the incorporation of the preceding documents, the description of the present invention herein shall control.

FIELD OF THE INVENTION

This invention relates generally to machine interfaces. More particularly, the invention relates to storage, use, conversion and recognition of phrases.

BACKGROUND OF THE INVENTION

Previously, electronic devices were controlled by manual input from a human. More recently, voice controlled devices have been introduced including computers having voice control software for control by a human user's speech.

In voice controlled devices, it is desirable to store phrases under voice control. As defined herein, a phrase is defined as a single word, or a group of words treated as a unit. This storing might be to set options or create personalized settings. Once stored, a phrase can later be used as a command or with a command as a data field or other object. A command is usually provided by a user to control a device. For example, in a voice-controlled telephone, it is desirable to store people's names and phone numbers under voice control into a personalized phone book. At a later time, this phone book can be used to call people by speaking their name (e.g. "Cellphone call John Smith", or "Cellphone call Mother").

Prior art approaches to storing the phrase ("John Smith") operate by storing the phrase in a compressed, uncompressed, or transformed manner that attempts to preserve the actual sound. Detection of the phrase in a command (i.e. detecting that John is to be called in the example above) then relies on a sound-based comparison between the original stored speech sound and the spoken command. Sometimes the stored waveform is transformed into the frequency domain and/or is time adjusted to facilitate the match, but in any case the fundamental operation being performed is one that compares the actual sounds. The stored sound representation and comparison for detection suffers from a number of disadvantages. If a speaker's voice changes, perhaps due to a cold, stress, fatigue, noisy or distorting connection by telephone, or other factors, the comparison typically is not successful and stored words are not recognized. Because the word or phrase is stored as a sound representation, there is no way to extract a text-based representation of the word or phrase. A sound stored phrase is strictly sound based. Additionally, storing a sound representation results in a speaker dependent system. It is unlikely that another user could speak the same word or phrase using the same sounds in a command and have it be correctly recognized. It would not be reliable, for example, for a secretary to store phonebook entries and a manager to make calls using those entries. It is desirable to provide a speaker independent storage means.

Additionally, if the words or phrases are stored as sound representations, the stored phrases can not be used in another speech recognition device unless the same waveform processing algorithms are used by both devices. Thus, transferring data associated with the stored sound phrases between devices, such as phone numbers in a phonebook, a cellphone or electronic organizer, is impractical unless the devices use the exact same speech recognition engine. It is desirable to recognize spoken words or phrases and store them in a representation such that, once stored, the phrases can be used for speaker independent recognition, can be used by multiple devices, and can be merged with the representations of other devices. Additionally, it is desirable to store information in text form, and to use it later in voice commands. For example, a text-based phonebook from a personal computer or organizer might be loaded into a cellphone with the text-based representation of the name John Smith and his phone number. In this case, it is desirable for any arbitrary speaker to be able to place a call using voice control (e.g. "Cellphone call John Smith").

SUMMARY OF THE INVENTION

The present invention includes a method, apparatus and system for storage of phrases using a speaker-independent representation, and for speech recognition that uses this representation, as described in the claims. Briefly, the present invention provides for the initial storage of a spoken phrase (for example, when making a new phonebook entry under voice control). This is processed by the speaker-independent speech recognition engine of the voice controlled device. This engine returns a speaker-independent representation of the phrase. This speaker-independent representation is what is stored.

When a spoken command is issued to the voice controlled device, it is also processed by the speaker-independent speech recognition engine of the present invention. This could be the same speaker-independent engine used for storing the original entries, or a completely different speaker-independent engine. In either case, the engine returns a speaker-independent representation of the phrase. This speaker-independent representation can be compared to earlier stored representations to determine whether this phrase is recognizable.

By using a speaker-independent representation for the stored entries and the phrases spoken later, a number of advantages result. Command recognition will be reliable even if a user's voice has changed due to a cold, stress, fatigue, transmission over a noisy or distorting phone link, or other factors Additionally, if a way to convert text to speaker-independent representations is provided, text-based information can reliably be used in spoken commands. Furthermore, by storing speaker independent representations of speech, recognition can be speaker-independent and is reliable even if someone else had stored the original voice entry. Stored phrases originating from multiple text sources and from different speakers can be merged and reliably used in speaker-independent recognition. The use of speaker independent stored entries facilitates upgrading to improved speaker-independent engines as they become available. New speaker-independent engines can use existing stored information without impacting reliability or requiring re-storage, since all stored entries are held in speaker-independent form. Using the speaker-independent stored entries can provide downward compatibility. New information, stored using the new improved speech recognition engines, can be used as commands in voice controlled devices having older speech recognition engines. Old and new generations of equipment can inter-operate without prior coordination by using the speaker independent representations. This allows, for example, two PDAs to exchange voice-stored phonebook entries and provide reliable recognition to the new users of that information. Finally, there are no legacy restrictions to hold back or restrict future development of speaker-independent recognition engines as long as they can create speaker-independent outputs, unlike waveform-storage based systems, which must always be able to perform exactly the same legacy waveform transformations.

OBJECTIVES OF THE INVENTION

A first objective of the present invention is to allow a phrase to be stored by one user, and later have that phrase spoken by the same user and properly recognized by the voice controlled device, even if the sound of the user's speech is different. The users' speech may be different for any reason, including sickness, stress, fatigue, or transmission over a noisy or distorting telecommunications link.

A second objective of the present invention is to allow a phrase to be stored by one user, and later have that phrase spoken by a different user and recognized correctly by the voice controlled device.

A third objective of the present invention is to allow a phrase to be stored on a first device by one user and then have the phrase be transferred to other devices, where it can be correctly recognized whether it is spoken by the same or another user.

A fourth objective of the present invention is to allow phrases stored using one speech recognition engine to be used for recognition with a different version or different model of speech recognition engine.

A fifth objective of the present invention is to allow manufacturers to continue to develop speech recognition engines in parallel, independent of each other. This can occur because phrases stored on early models of recognizers can be recognizable on later models of recognizers. In addition, phrases stored on later models can be recognized on earlier models. Furthermore, phrases stored by one manufacturer's recognizer can be recognized by another's. Included in this objective is providing an invention that preserves this capability even between speech recognition engines not yet invented.

A sixth objective of the present invention is to permit the consolidation of phrases entered by speech, and phrases entered by text (including Caller-ID, text-based personal or public phone books, keypad entry or other means), into a single set of phrases that can be recognized.

A seventh objective of the present invention is to allow the capture of directory assistance numbers which can alter be retrieved by a person speaking the associated name.

DETAILED DESCRIPTION

Speech recognition software is now available that can perform speaker-independent recognition and which generates speaker-independent representations of the spoken speech. The present invention uses speaker-independent recognition software in combination with other elements for storing phrases, using phrases, converting phrases and recognizing phrases. As defined herein, a phrase is defined as a single word, or a group of words treated as a unit. The present invention communicates using audible and non-audible speech. Speech as defined herein for the present invention encompasses a) a signal or information, such that if the signal or information were passed through a suitable device to convert it to variations in air pressure, the signal or information could be heard by a human being and would be considered language, and b) a signal or information comprising actual variations in air pressure, such that if a human being were to hear the signal, the human would consider it language. In the preferred embodiment, the speaker-independent representation of speech is a phonetic representation of speech. Other speaker-independent representations of speech may also be used in accordance with the present invention.

Figure 1:
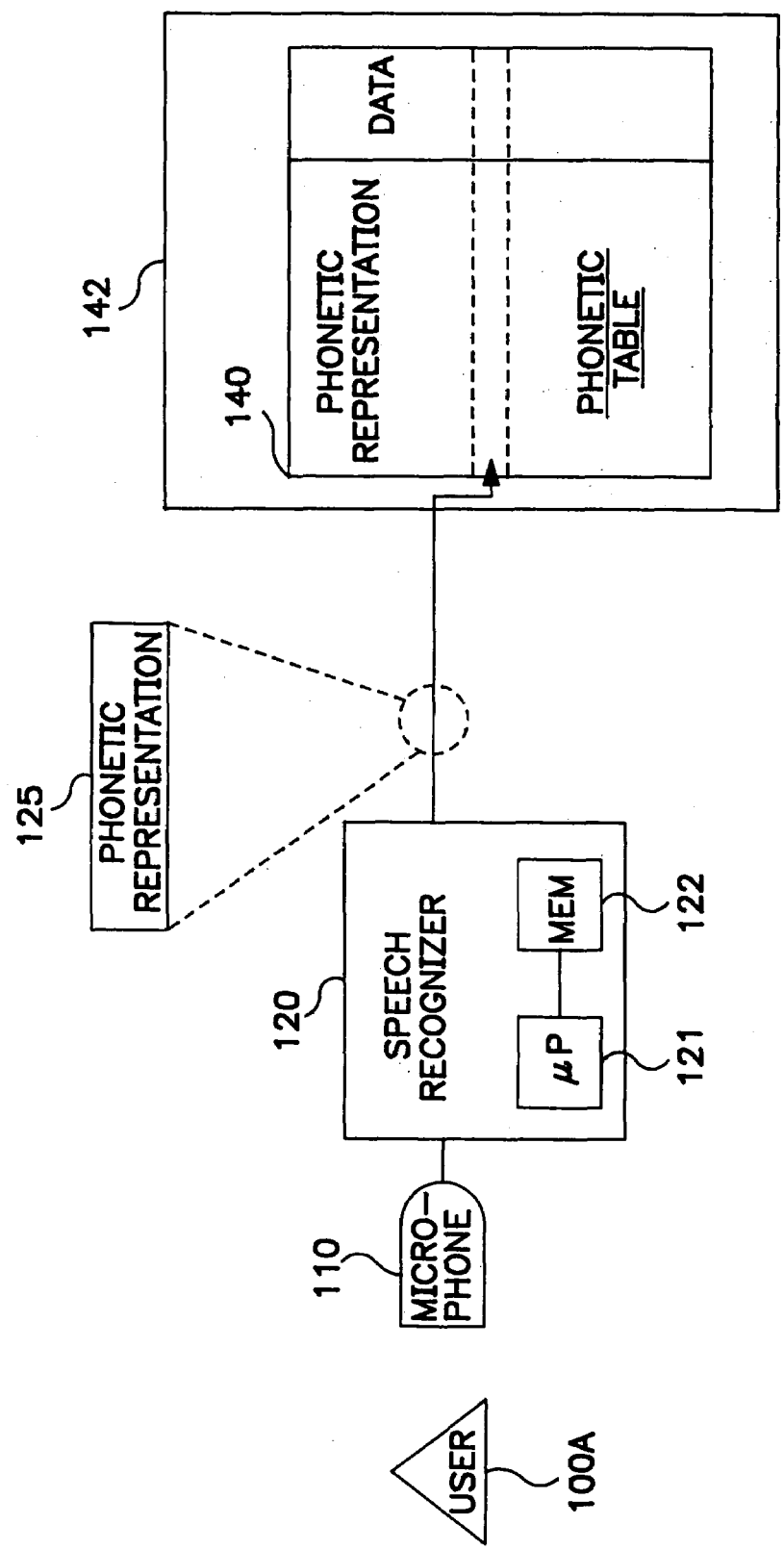
FIG. 1 is a block diagram of a voice controlled device illustrating phrase storage.

Referring to FIG. 1, consider the storage of phrases. During the storing of a phrase, a user 100A speaks the phrase to be stored into microphone 110. The phrase is processed by the speech recognizer 120, which generates the speaker-independent phonetic representation of the speech 125. This representation is entered into Table 140, possibly with additional data. Speech recognizer 120 includes a processor 121 and software code stored in storage medium 122. Table 140 is resident in storage medium 142. Storage medium 122 and 142 may be in the same physical storage device or medium, or separate devices or medium.

Consider for example, a telephone application with a dial-by-spoken-name feature, in which the telephone is issued the command "Dial John Smith". The additional data in Table 140 might be one or more phone numbers for John Smith. In this example, the phrase stored as a phonetic representation is "John Smith".

Speech recognizer 120 can also be used to capture the phone number information, converting from a spoken phone number to digital digits, or the phone number can be entered by a keypad or other input means.

Depending on the type of device using the present invention, there may be a check prior to storing the phrase in Table 140 to see if there is already an entry with the same or similar phonetic representation, such that errors in recognition might occur if both phrases were stored. If there is, the user can be prompted to take appropriate action, depending on the type of device utilized. Considering the telephone example, a user might try to store a second phone number for the same specific person. This might be acceptable if there is a way to determine which number was intended to be called (e.g. the user says "Call John Smith", and the machine prompts "Say 'first' to call 234-5678 and say 'second' to call 987-6543.") Alternatively, if there is no way provided to select from multiple phone numbers for the same person when calling, the user may be prompted while storing a second entry to rename the new entry. For example, the user can store it under "John Smith Office" to differentiate it from the phrase "John Smith", assuming "John Smith" is already associated with another number such as a home number. There are a variety of ways to handle these situations.

Figure 2:
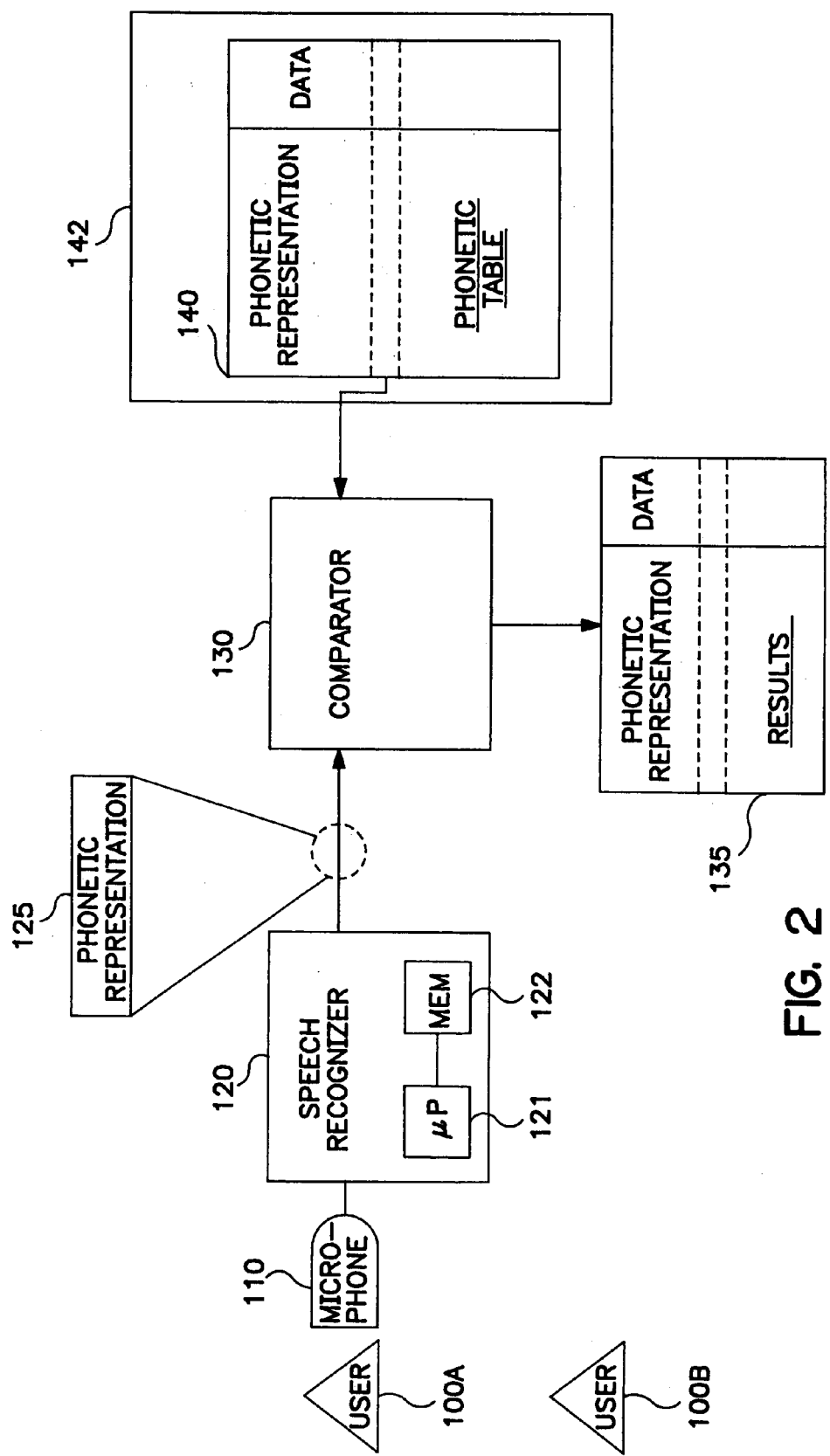
FIG. 2 is a block diagram of a voice controlled device illustrating phrase recognition.
Figure 3:
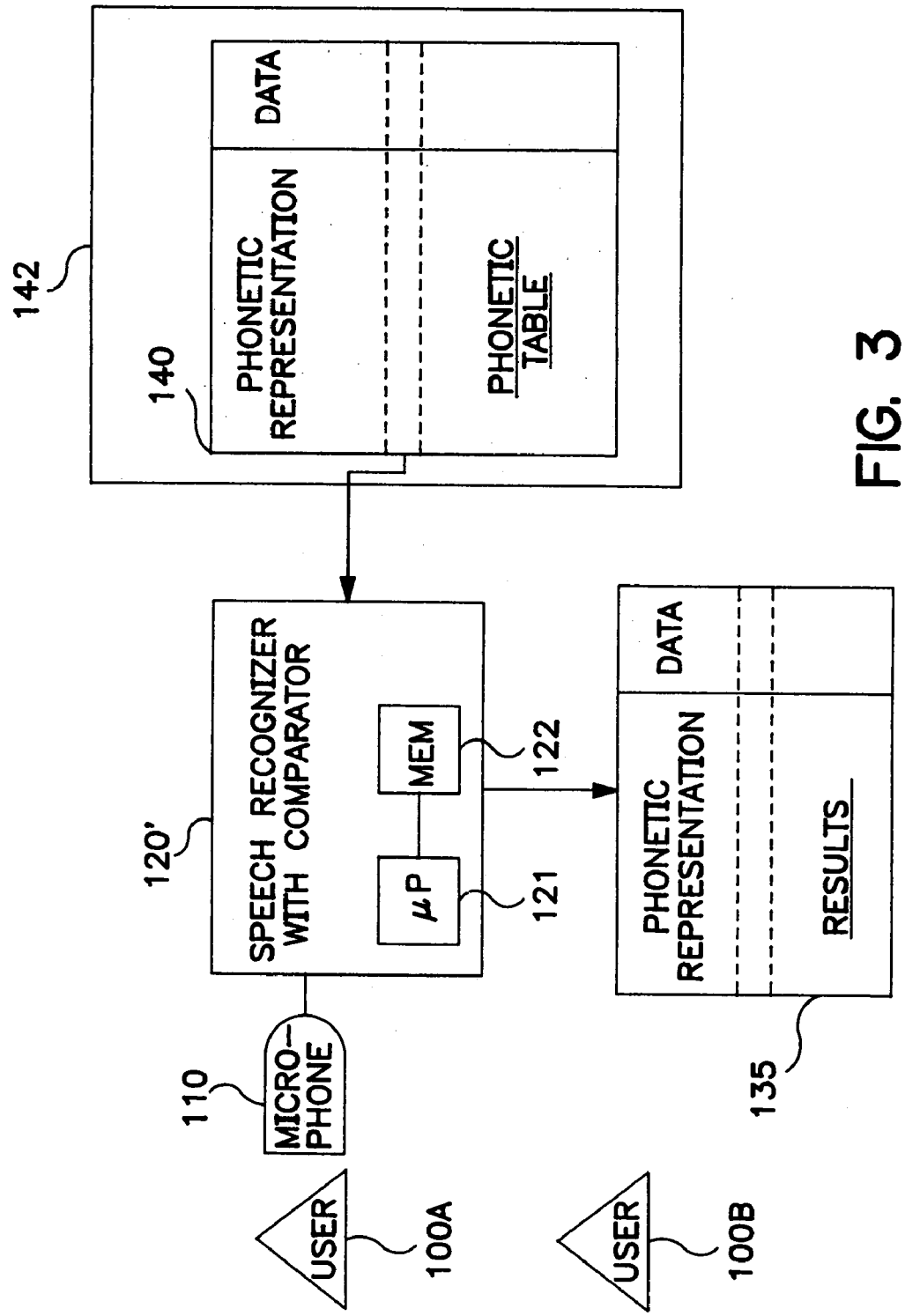
FIG. 3 is a block diagram of an alternate embodiment of the recognizer and comparator of FIG. 2.
Figure 4:
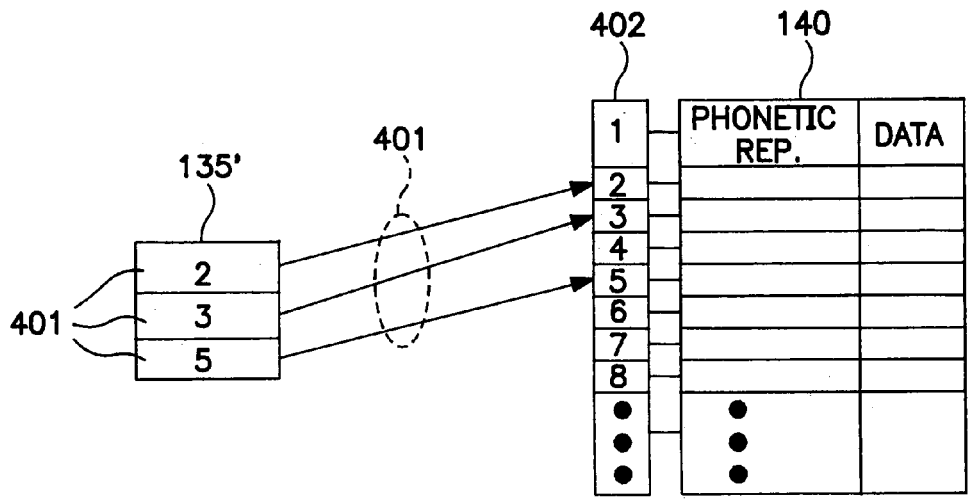
FIG. 4 is a block diagram of an alternate method by which recognition result may be represented.

Once there are one or more entries stored in Table 140, a user can make use of them. As shown in FIG. 2, the user 100A can speak a phrase, which is picked up by microphone 110 and converted to a phonetic representation by speech recognizer 120. The phonetic representation is compared to the entries in Table 140 by a comparator 130. In FIG. 2, the comparator 130 is shown separate from the speech recognizer 120. It is possible to incorporate the comparator function into the speech recognizer. This variation is shown in FIG. 3 as speech recognizer and comparator 120'. In either event, as a result of the comparison, results are returned which can be a result set of no matches, one match, or multiple matches. The computer may look for perfect matches or also good matches as is customary in speech recognition. This result set is represented by Results 135, which can include the phonetic representation(s) found, the data element(s) found, both, or some other results indicator appropriate for the intended application. As an example of an alternative results indicator, FIG. 4 shows results 135' consisting of a pointer or index or multiple pointers or indexes into Table 140 indicating which elements were matched. In FIG. 4, rows numbered 2, 3, and 5 in Table 140 are illustrated as being successfully matched by results 135' by pointers 401 over the set of rows 402.

As stated, it is possible to have the recognizer 120 or 120' identify multiple possible matches. In this case, a variety of alternatives can be used to narrow the selection down to a single matching result prior to further processing, if a single matching result is required. Alternatively, multiple selections can each be processed further, which may or may not include a later selection of a single matching result from multiple matching results. Possible ways to determine which of multiple results should be selected as a best match include asking the user to specify which was the best match, having the recognizer pick one of the multiple matches, or have the recognizer request the user to re-speak the phrase. Having the user re-speak the phrase may result in a single match due to slightly different voicing by the speaker. Alternatively, the first and subsequent speaking of the phrase may be used collectively to help identify a single best match for the result.

The representation of phrases in Table 140 against which the speech engine compares the microphone input is phonetic in nature. Some speech recognition systems attempt to identify a phrase by comparing against the actual sounds spoken by a user for target phrases. The Dynamic Time Warping method is one of these that makes use of the approach of comparing actual sounds. However, the present invention relies on a speaker-independent system, which in the preferred embodiment operates on a phonetic representation of target phrases stored in table 140.

There are multiple ways of representing phonetic pronunciations, including representation of phonemes, representation of smaller sound elements than phonemes, or representation of larger sound elements than phonemes. One can also have a phonetic representation that consisted of combinations of these elements. The present invention encompasses these variations, along with other speaker-independent representations.

With some phrases, there are multiple acceptable ways of saying them. For example, the word "lead" can be pronounced "led" or "leed". There are many other examples such as this in English and other languages. In these cases, there can be multiple entries for a target phrase in Table 140 to account for the multiple pronunciations and/or the code of the speech recognizer can be programmed to account for these variations.

Because Table 140 stores a speaker independent representation of a spoken phrase, specific advantages are obtained. First, the recognition process is insensitive to changes in the speakers voice, as might be caused by sickness, stress, fatigue, transmission over a noisy or distorting phone link, or other factors.

Second, it is possible for one user, for example user 100A in FIG. 1, to store a phrase, and another user, for example user 100B in FIG. 2, to use the phrase in a spoken command. This is useful, for example, in allowing a secretary to store phone numbers in a cellphone for dial-by-name use, which is later used by a manager to make calls.

Figure 5:
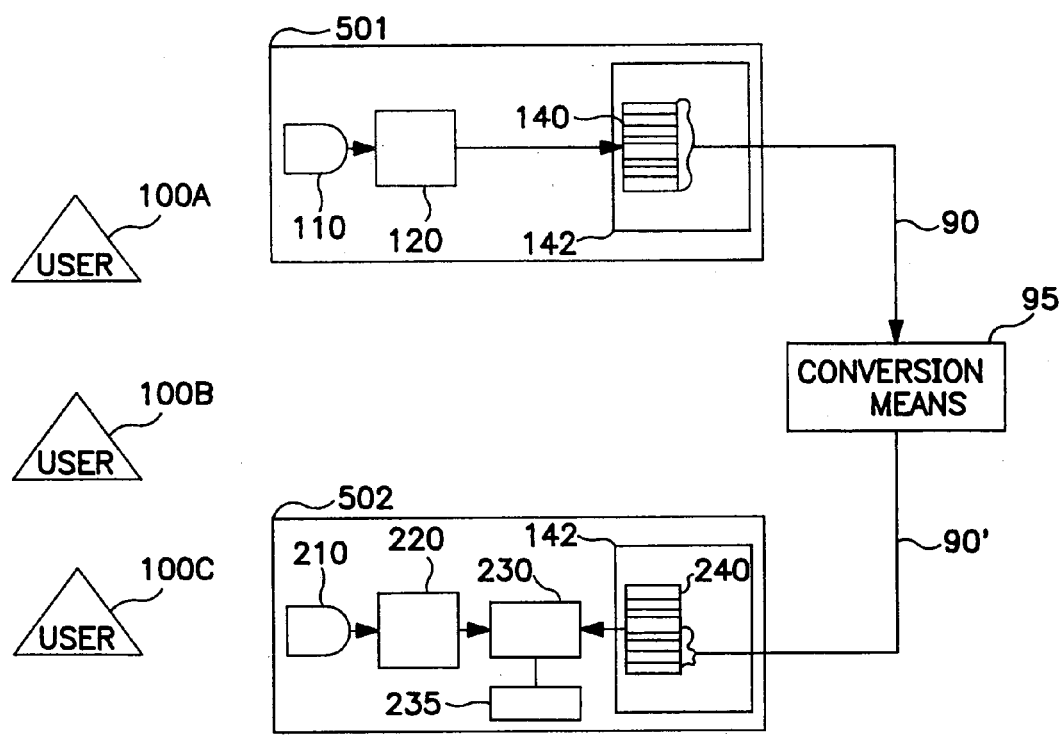
FIG. 5 is a block diagram of two voice controlled devices illustrating exchange of phrases to be recognized.

Third, with reference to FIG. 5, the present invention allows information in a first device 501 that has a Table 140, containing phonetic representations and data, to be transferred by transfer means 90 and 90' to a second device 502 that has a table 240 containing phonetic representations and data. Table 140 and Table 240 may have different types of data and different phonetic representations (or, in the general case, different speaker-independent representations), in which case a conversion means 95 can be used to provide translation. The phonetic representations and data of Table 140 being transferred into Table 240 may replace all existing information in Table 240, may replace or update selected records, or may be appended to the existing records in Table 240. It is also possible to include a date-time stamp or other information within the data, which can be used, in addition to the phonetic representation, to determine how the Table 140 and Table 240 data are combined. For example, where there are duplicate phonetic representations, the data associated with the newest representation can be preserved. The specific actions taken will depend on the type of device, characteristics of the information, and the variety of known methods of merging, updating, replacing and synchronizing tables of information which is used and widely documented in public literature. The present invention encompasses these variations.

Once the phonetic representations and data from Table 140 are incorporated into Table 240, the entire set of Table 240 entries can be used for recognition by any individual. The phrases stored in Table 240 might be spoken by the same user 100A who originally recorded the information in Table 140. Alternatively, the phrases stored in Table 240 might be spoken by the user 100B who recorded the original information in Table 240 before the transfer of information from Table 140. Alternatively, the phrases might be spoken by a user 100C who recorded none of the Table 140 or Table 240 information. Because the information stored in Table 240 is phonetically based, the speech recognizer can use it to recognize speech from any of these users 100A, 100B, or 101C.

Furthermore, since the data in Table 240 is phonetically based, it is not necessary for speech recognizer 220 to have the same speech recognition software as speech recognizer 120. For example, one version of the speech recognition software may be released later having more sophisticated speech recognition algorithms than the other. Alternatively, they might be speech recognizers from different manufacturers with phonetic recognizers. By using conversion means 95 to perform conversion from Table 140's phonetic representation to Table 240's representation, it is not even necessary for the phonetic representations or data of Table 140 and Table 240 to be identical. It is only necessary that there be some mapping that can be performed by between Table 140's phonetic representation and Table 240's phonetic representation, and mappings for any portions of the data fields to be transferred. These mappings are performed by the conversion means 95. The goal is to have the same phonetic information (but not necessarily the same representation of that phonetic information) in Table 140 and Table 240 for the transferred records, and the same data field information (but not necessarily the same representation of that data field information) in Table 140 and Table 240 for the transferred records. More generally, with respect to the stored phrases, the goal is to have the same speaker-independent information (but not necessarily the same speaker-independent representation) in Table 140 and Table 240 for the transferred records. Moreover, while perfect conversion is preferable, if minor conversion errors are introduced by conversion means 95; perhaps due to difficulties in mapping between the two representations, algorithm errors or other issues so that the phonetic information is similar but not precisely the same; acceptable recognition is achievable.

This ability to transfer phonetic representations and associated data between devices with different versions of speech recognizers or recognizers from different manufacturers is an important issue. This means recognizers can be improved without being held back by legacy phonetic representation and data representation issues. Development can also proceed in parallel at multiple manufacturers, each working independent of the other. The approach also is valid even for those speech recognizers not yet conceived or invented. In all cases, the only requirement is that there be some mapping that can be implemented by conversion means 95 between the current phonetic representation and that used in the future system. This is in contrast to speech recognition systems that use dynamic time warping and other approaches that attempt to match actual sound patterns, where it is very difficult to change or improve the algorithm without losing the ability to recognize previously captured phrases.

Returning for a moment to conversion means 95, and transfer means 90 and 90'. They can be unidirectional, in which case data can be transferred from Table 140 to Table 240, but not from Table 240 to 140. Or they can be bi-directional, in which case data can move from Table 140 to table 240, or from Table 240 to Table 140.

So far the description of the present invention has focussed on the phonetic representation of the phrase. In many cases, it is also helpful to have a corresponding text representation. The present invention provides a variety of ways that a text representation can be matched to a phonetic representation.

Figure 6:
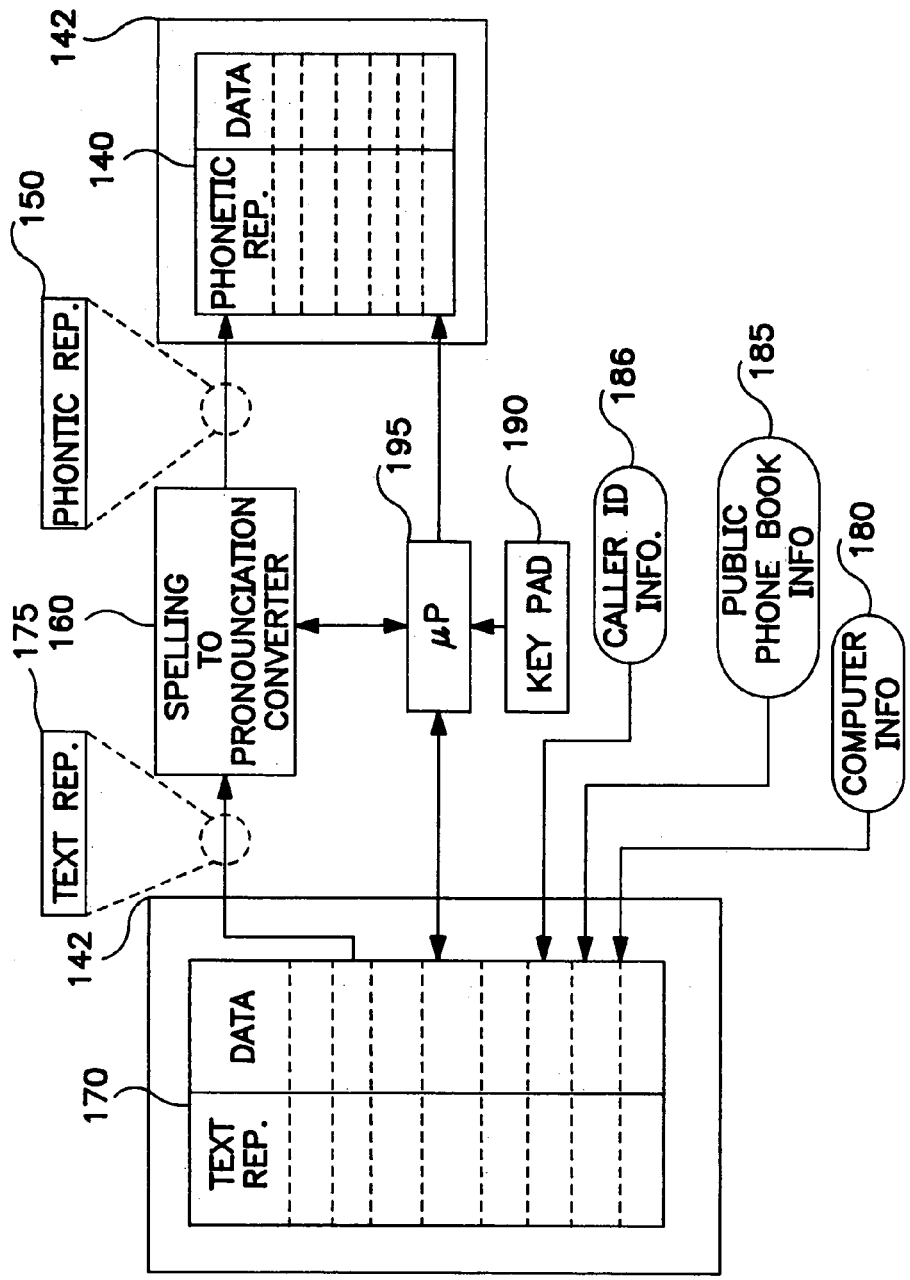
FIG. 6 is a block diagram illustrating the method by which text-based representations can be incorporated into a phonetic speech recognition system.

A first method by which a text representation can be matched to a phonetic representation is by direct translation. FIG. 6 shows a Text Table 170 that contains one or more records that each consist of a text representation of a phrase and possibly additional data. To allow recognition of a text representation of a phrase, it is necessary to convert the text representation into a speaker independent representation of Table 140, which in the preferred embodiment is a phonetic representation. The Spelling to Pronunciation Converter 160 in FIG. 6, which is commercially sold by Conversational Computing Corporation as part of their speech-controlled web browsing product, has such a capability. By means of the Spelling to Pronunciation Converter 160, records 175 from table 170 can be converted to Records 150 which are phonetic representations and can be loaded into Table 140. Once a phonetic representation record 150 is created, it can be incorporated into table 140 in a variety of ways. The choice of incorporation method depends on the particular device and result desired. Some alternatives include always appending the record to Table 140, making the storage of the record in the Table 140 conditional on the results of first searching for a pre-existing identical or similar record in the table, making storage of the record conditional on additional information, or performing some type of merging of the new record with one or more pre-existing records. The specific actions taken will depend on the type of device and characteristics of the information, and a variety of methods of merging, updating, replacing and synchronizing tables of information which are widely available and documented in public literature. The present invention encompasses all these variations.

In any event, once the information has been moved from text Table 170 to phonetic Table 140, the speech recognition process described elsewhere in this document can be used to compare incoming speech to the phrases in Table 140.

Figure 7:
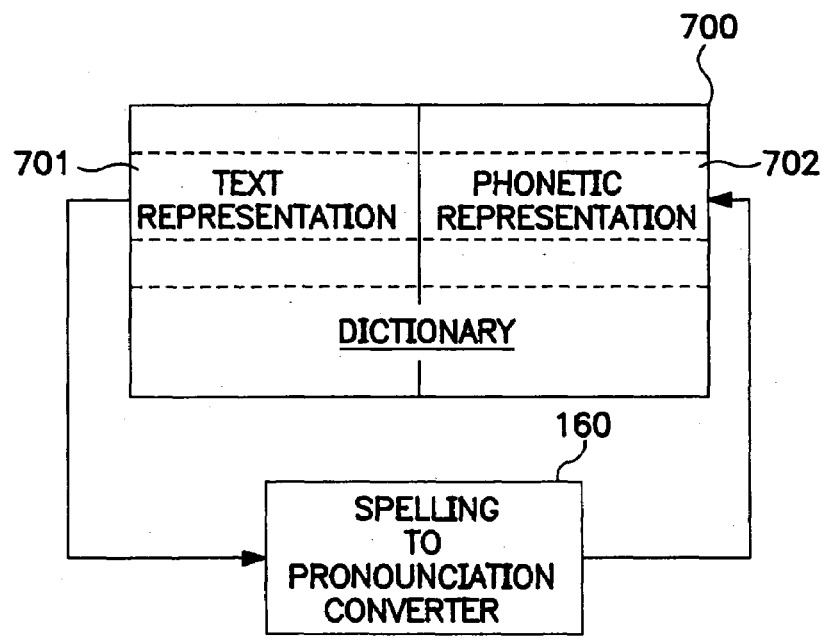
FIG. 7 is a block diagram of the method of formation of a mapping dictionary.

A second method by which a text representation can be matched to a phonetic representation is by converting phonetic representations to text representations. This can be done by phonetic-to-text software algorithms or through use of a dictionary formed using spelling-to-pronunciation translation. The dictionary method is shown in FIG. 7. The dictionary 700 consists of a series of records, each of which has space for a text representation 701 and a phonetic representation 702. Initially, the set of all possible text representations is loaded into the text representation 701 field of the records, and the phonetic representation field 702 is left blank.

Each text representation 701 is then processed by spelling to pronunciation conversion software 160 to create the corresponding phonetic representation, which is stored in the associated phonetic representation field. At the end of this process, the dictionary shows the text representation for each possible phonetic representation. Given a phonetic representation, the dictionary can be scanned to determine whether there is none, one or more than one text representation 701 for the given phonetic representation 702. The dictionary can be sorted or indexed on the phonetic representation field 702 to speed this lookup. In the event there is more than one text representation 701, a variety of options are possible, including returning all possible text representations 701 entries, or making some type of machine-based or user-assisted selection of which to use.

In the two above methods for matching text representations to phonetic representations, while perfect conversion of the spelling-to-pronunciation is preferable, even if minor conversion errors occur, acceptable recognition or matching to existing records is still be achievable, providing the matching process looks for the best match rather than a perfect match.

A third method by which text representations and phonetic representations can be matched is by comparing the contents of the data fields. In this approach, with reference to FIG. 6, the data field of Phonetic Table 140 and the data field of Text Table 170 both share common data elements that help uniquely identify which text representation can be paired with a phonetic representation. For example, in a telephone application, the data fields of both Phonetic Table 140 and Text Table 170 might have the phone number for a person. The name of this person is stored phonetically in the phonetic representation field of Phonetic Table 140 alongside the data field with their phone number, perhaps due to the user storing them as described above for FIG. 1. The name of this person is also stored textually in the text representation field, along with their phone number in the data field of Text Table 170. By identifying matching phone numbers in Phonetic Table 140 and Text Table 170, matching phonetic representations and text representations can be identified. A best match comparison rather than a perfect match comparison, perhaps with a required limit on the allowed degree of mismatch, may be needed for some applications to accommodate for possible minor differences, for example errors arising from typos, in the data field keys.

A fourth method by which text representations and phonetic representations can be matched is by way of a spoken spelling interface, in which the user spells the text that corresponds to a phonetic representation. A description of how spoken spelling information can be converted to a text representation is contained in U.S. Pat. No. 5,799,065. A best match, rather than a perfect match, can be used to accommodate minor spelling errors.

Reconsider the telephone example. If there are a multiplicity of phone numbers associated with one record and no other, and a match is made between the phonetic representation and text representation, then both the phonetic representation and text representation can be associated with the multiplicity of phone numbers.

More specifically, assume for example that the information in Table 170 has been created by loading information from a personal digital assistant, and it includes office, home and cellular phone numbers. Assume the user 100A has stored, by the process depicted in FIG. 1, the office phone number in Table 140. By locating the match between Table 140 and Table 170 records, the user can speak the target's name and have access to all three numbers—office, home and cellular.

In the more general case, once matching relationships are found between phonetic Table 140 entries and text Table 170 entries, the entries in both tables can be provided including the union of all information in the data fields of the matching records of both Tables.

Consider now how text entries for text Table 170 might originate for a telephone application. Referring to FIG. 6, alternatives for text entries include text information from a telephone's Caller-ID system 186, from public phone books 185, computer information 180 such as from personal computer or PDA (Personal Digital Assistant) databases or applications, or information from a keyboard 190 or other input means attached to a device, such as microprocessor 195, having access to the Text Table 170.

Alternatively, a user can store a phone number by speech such as by saying the number and an identifier (e.g., 234-5678 for John Smith). In this case, the phonetic representation of the name "John Smith" is stored in the phonetic representation field of a record in Table 140, and the phone number is stored in the data field. Assume the telephone is equipped with a Caller-ID capability 186 that provides the phone number and text name of the party on the other end of the telephone call. The Caller ID name can be processed with spelling to phonetic software. If there is a reasonable match to the phonetic representation, it can be stored as a text representation in Table 170 with the phone number in the data field and the text name of the caller in the text representation field. (If there is not a close match, it may indicate that the phone's registration and hence Caller ID information is in another person's name, in which case it may not be desirable to store the text representation.) By comparing the phone numbers in the data fields of Table 140 and Table 170, it is possible to create a representation of the complete information for the caller, including the text name, the phonetic representation, and the combination of the data fields. If John Smith later calls the telephone from another location, that Caller ID record can be added so that there are now two phone numbers accessible by speaking John Smith's name. Loading records from or synchronization of records with other data sources, including those shown in FIG. 6, can further enhance the information available by voice control.

Figure 8:
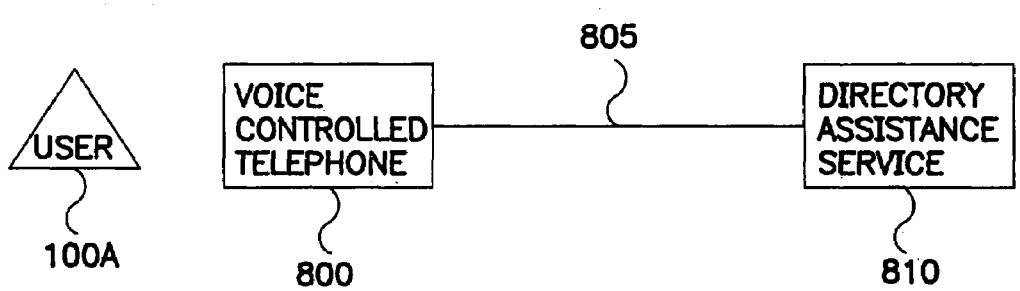
FIG. 8 is a block diagram of the method of capturing data by a speech interface.

Another method of capturing additional data is by a speech interface. For example, consider a telephony application, as shown in FIG. 8, consisting of a user 100A, a voice controlled telephone 800, a directory assistance service 810, and a communications medium 805 that connects voice controlled telephone 800 to directory assistance service 810. The directory assistance service 810 can be a human, a machine based system, or a system using a mixture of human and machine interactions. When a user speaks the command to call a name not currently in the voice controlled Telephone 800's Table 140, the telephone can automatically dial directory information and in response to hearing the phrase "name" (as in the operators inquiry "what name please?"), automatically pass the requested name to the operator. The speech recognizer can also listen for the report from directory assistance service 810 of the number for the desired person, and capture this. The spoken name's phonetic representation can be stored in the phonetic representation portion of a record in table 140, and the phone number stored in the data portion. If that person later calls the phone, their Caller ID number or name can be sued to identify a matching phonetic representation stored. The Caller ID name can then be stored as the text representation in Table 170.

In general, one or more external data sources can be used to populate entries within text Table 170. The specific choices of external data sources depend on the nature of the application. Further elucidating the possible implementations, Table 170 can be located in the same device that comprises Table 140, or they can be in separate devices connected via a communications method. The information of how Table 140 and Table 170 entries are matched can be stored in a variety of forms, including being stored by being copied or moved into a new table, stored in a Table 140 in which the text representation is included in the data field, stored in a Table 170 in which the phonetic information is included in the data field, stored using a third table that stores pointers to the records in tables 140 and Tables 170 that correspond, or through other means. The present invention is intended to address all these variations.

Finally, once the text and corresponding phonetic information is matched up, it can be transferred to other devices as described above and as displayed in FIG. 5.

Additionally, the present invention is applicable to any language, including English, because it is based on speaker independent representations, including phonetic representations, which are applicable to any language.

In the preceding descriptions, it was stated that speech originated from a user, depicted in the Figures as 100A, 100B, 100C, and the like. It is within the scope of the invention that these users can be all humans, all machines with speech interfaces that interact with the machine of the present invention through speech, or any mixture of humans and machines. This includes machine-to-machine speech communication over wired and wireless links which may not include any audible speech.

Audible speech refers to speech that a human can hear unassisted. Non-audible speech refers to any encodings or representations of speech that are not included under the definition of audible speech, including that which may be communicated outside the hearing range of humans and transmission media other than air.

The machine-to-machine speech communication possibilities includes the scenario where a plurality of communicating machines incorporate the present invention. The present invention includes the cases where machine-to-machine speech communication involves more than two machines, as might occur where there are multiple interacting devices within one room or on one telephone line.

The preferred embodiments of the present invention for "METHOD AND APPARATUS FOR VOICE CONTROLLED DEVICES WITH IMPROVED PHRASE STORAGE, USE, CONVERSION, TRANSFER, AND RECOGNITION" are thus described. While the present invention has been described in particular embodiments, the present invention should not be construed as limited by such embodiments, but rather construed according to the claims that follow below.

What is claimed is:

1. A method of transferring speaker independent representations of at least one speaker dependent spoken word between voice controlled devices, the method comprising:

receiving at least one speaker dependent spoken word at a first voice controlled device having a first speaker dependent spoken word recognizer;

converting at the first voice controlled device, the at least one speaker dependent spoken word into at least one speaker independent representation of the at least one speaker dependent spoken word; and, transferring the at least one speaker independent representation of the at least one speaker dependent spoken word to a second voice controlled device for recognizing the speaker independent representation of speech, the second voice controlled device having a second speaker dependent spoken word recognizer for recognizing the at least one speaker dependent spoken word at the second voice controlled device, and converting at the second voice controlled device, the at least one speaker dependent spoken word into at least one speaker independent representation of the at least one speaker dependent spoken word.

2. The method of claim 1, wherein, the at least one speaker independent representation of the at least one speaker independent spoken word is a phonetic representation of the at least one speaker dependent spoken word.

3. The method of claim 1, wherein, the first voice controlled device utilizes one type of speaker independent representation of the at least one speaker dependent spoken word and the second voice controlled device uses a different type of speaker independent representation of the at least one speaker dependent spoken word and the method further comprises:

converting the at least one speaker independent representation of the at least one speaker dependent spoken word from the first voice controlled device into a type of speaker independent representation of the at least one speaker dependent spoken word compatible with the second voice controlled device.

4. A method of transferring speaker independent representations of speaker dependent spoken words between voice controlled devices, the method comprising:

receiving at least one speaker dependent spoken word at a first voice controlled device having a first the at least one speaker dependent spoken word recognizer;

converting the at least one speaker dependent spoken word into at least one speaker independent representation of the at least one speaker dependent spoken word;

providing a set of speaker independent representations of the at least one speaker dependent spoken word associated with a second voice controlled device having a second at least one speaker dependent spoken word recognizer; and transferring the at least one speaker independent representation of the at least one speaker dependent spoken word from the first voice controlled device to the second voice controlled device for combining with the set of speaker independent representations of the at least one speaker dependent spoken word, the second voice controlled device recognizing at least one speaker dependent spoken word at the second voice controlled device, and for recognizing a speaker independent representation of speech.

5. The method of claim 4, wherein, the set of speaker independent representations of the at least one speaker dependent spoken word is empty.

6. The method of claim 4, wherein, the set of speaker independent representations of the at least one speaker dependent spoken word has one speaker independent representation of the at least one speaker dependent spoken word.

7. The method of claim 4, wherein,
the set of speaker independent representations of the at least one speaker dependent spoken word has more than one speaker independent representation of the at least one speaker dependent spoken word.

8. The method of claim 4, wherein,
the at least one speaker independent representation of the at least one speaker dependent spoken word is a phonetic representation of the at least one speaker dependent spoken word.

9. The method of claim 4, wherein,
the at least one speaker independent representation of the at least one speaker dependent spoken word of the first voice controlled device transferred to the second voice controlled device is combined with the set of speaker independent representations of the at least one speaker dependent spoken word in the second voice controlled device by merging the at least one speaker independent representation of the at least one speaker dependent spoken word with the second set of speaker independent representations of the at least one speaker dependent spoken word.

10. The method of claim 4, wherein,
the at least one speaker independent representation of the at least one speaker dependent spoken word of the first voice controlled device transferred to the second voice controlled device is combined with the set of speaker independent representations of the at least one speaker dependent spoken word in the second voice controlled device by replacing the set of speaker independent representations of the at least one speaker dependent spoken word in its entirety with the at least one speaker independent representation of the at least one speaker dependent spoken word.

11. The method of claim 4, wherein,
the at least one speaker independent representation of the at least one speaker dependent spoken word of the first voice controlled device transferred to the second voice controlled device is combined with the set of speaker independent representations of the at least one speaker dependent spoken word in the second voice controlled device by selectively replacing elements of the set of speaker independent representations with elements of the at least one independent representation of the at least one speaker dependent spoken word.

12. The method of claim 4, wherein,
there are date stamps associated with the at least one speaker independent representation of the at least one speaker dependent spoken word and with the set of speaker independent representations of the at least one speaker dependent spoken word, and the at least one speaker independent representation of the at least one speaker dependent spoken word is combined with the second set speaker independent representations of the at least one speaker dependent spoken word using the date stamps.

13. The method of claim 4, wherein,
the first the at least one speaker dependent spoken word recognizer of the first voice controlled device is a first speaker independent the at least one speaker dependent spoken word recognizer;
the second the at least one speaker dependent spoken word recognizer of the second voice controlled device is a second speaker independent the at least one sneaker dependent spoken word recognizer; and
the first speaker independent the at least one speaker dependent spoken word recognizer is of the same design as the second speaker independent the at least one speaker dependent spoken word recognizer.

14. The method of claim 4, wherein,
the first the at least one speaker dependent spoken word recognizer of the first voice controlled device is a first speaker independent the at least one speaker dependent spoken word recognizer;
the second the at least one speaker dependent spoken word recognizer of the second voice controlled device is a second speaker independent the at least one speaker dependent spoken word recognizer; and
the first speaker independent the at least one speaker dependent spoken word recognizer is of a different design than the second speaker independent the at least one speaker dependent spoken word recognizer.

15. The method of claim 4, wherein,
the first voice controlled device and the second voice controlled device use different speaker independent representations of the at least one sneaker dependent spoken word, and
the method further comprises:
converting the at least one speaker independent representation of the at least one speaker dependent spoken word into a type of speaker independent representation of the at least one speaker dependent spoken word compatible with the second voice controlled device.

16. The method of claim 15, wherein,
the type of speaker independent representation of the at least one speaker dependent spoken word compatible with the second voice controlled device is a phonetic representation of the at least one speaker dependent spoken word.

17. A method of providing interoperability for speaker independent the at least one speaker dependent spoken word recognizers, the method comprising:
providing a first the at least one speaker dependent spoken word recognizer;
the first the at least one speaker dependent spoken word recognizer receiving at least one speaker dependent spoken word;
converting the at least one speaker dependent spoken word into at least one speaker independent representation of the at least one speaker dependent spoken word;
providing the at least one speaker independent representation of the at least one speaker dependent spoken word to a second the at least one speaker dependent spoken word recognizer, the second speech recognizer recognizing at least one speaker dependent spoken word at the second voice controlled device, and for recognizing a speaker independent representation of speech;
wherein the first the at least one speaker dependent spoken word recognizer and the second the at least one speaker dependent spoken word recognizer use different types of speaker independent representations of the at least one speaker dependent spoken word; and
the method further comprises:
converting the speaker independent representation of the at least one speaker dependent spoken word of the first the at least one speaker dependent spoken word recognizer into a type of speaker independent representation of the at least one speaker dependent spoken word compatible with the second the at least one sneaker dependent spoken word recognizer.

18. The method of claim 17, wherein,
the first the at least one sneaker dependent spoken word recognizer is within a first device and the second the at least one speaker dependent spoken word recognizer is within a second device.

19. The method of claim 17, wherein,
the first the at least one speaker dependent spoken word recognizer and the second the at least one speaker dependent spoken word recognizer are the same design.

20. The method of claim 17, wherein,
the first the at least one speaker dependent spoken word recognizer and the second the at least one speaker dependent spoken word recognizer are of different designs.

21. The method of claim 17, wherein,
the speaker independent representations of the at least one speaker dependent spoken word are phonetic representations of the at least one speaker dependent spoken word.

22. The method of claim 17, wherein,
the at least one speaker independent representation of the at least one speaker dependent spoken word is a phonetic representation of the at least one speaker dependent spoken word.

23. The method of claim 17, wherein,
the type of speaker independent representation of the at least one speaker dependent spoken word compatible with the second the at least one speaker dependent spoken word recognizer is a phonetic representation of the at least one speaker dependent spoken word.

24. A method of transferring speaker independent representations of speaker dependent spoken words between voice controlled devices, the method comprising:
providing a first the at least one speaker dependent spoken word recognizer that operates with a first type of speaker independent representation of the at least one speaker dependent spoken word;
the first the at least one speaker dependent spoken word recognizer receiving at least one speaker dependent spoken word;
converting the at least one speaker dependent spoken word into at least one speaker independent representation;
providing a second the at least one speaker dependent spoken word recognizer that operates with a second type of speaker independent representation of the at least one speaker dependent spoken word, the second speech recognizer recognizing at least one speaker dependent spoken word at the second voice controlled device, and for recognizing the second type of speaker independent representation of speech;
providing a conversion means for converting the first type of speaker independent representation of the at least one speaker dependent spoken word into a type compatible with the second the at least one speaker dependent spoken word recognizer; and
providing a conversion means for converting the second type of speaker independent representation of the at least one speaker dependent spoken word into a type compatible with the first the at least one speaker dependent spoken word recognizer.

25. The method of claim 24, wherein,
at least one of the first or second type of speaker independent representations of the at least one speaker dependent spoken word is a phonetic representation of the at least one speaker dependent spoken word.

26. A method for converting the at least one speaker dependent spoken word into text, the method comprising:
receiving at least one speaker dependent spoken word of one or more spoken words;
converting the at least one speaker dependent spoken word into at least one speaker independent representation of the at least one speaker dependent spoken word;
communicating at least one second speaker dependent spoken word;
converting the at least one second speaker dependent spoken word into at least one speaker independent representation of the at least one speaker dependent spoken word for recognition;
comparing the at least one speaker independent representation of the at least one speaker dependent spoken word for recognition with the at least one speaker independent representation of the at least one speaker dependent spoken word to generate a match result; and
converting the at least one speaker independent representation of the at least one speaker dependent spoken word into text.

27. The method of claim 26, further comprising:
storing the at least one speaker independent representation of the at least one speaker dependent spoken word in a storage.

28. The method of claim 26, wherein,
the converting is performed by a the at least one speaker dependent spoken word-to-text converter.

29. The method of claim 26, wherein,
the converting provides one or more possible text results and the method further comprises:
processing at least one of the possible text results to create at least one possible speaker independent representation of the at least one speaker dependent spoken word; and
comparing the at least one speaker independent representation of the at least one speaker dependent spoken word stored in storage with the at least one possible speaker independent representation of the at least one speaker dependent spoken word to generate text.

30. The method of claim 26, wherein,
the at least one speaker independent representation of the at least one speaker dependent spoken word is a phonetic representation of the at least one speaker dependent spoken word.

31. The method of claim 26, further comprising:
providing a first additional data associated with the speaker independent representations of the at least one speaker dependent spoken word stored in storage;
providing one or more possible text results;
providing a second additional data associated with the possible text results; and
using relationships between the first additional data and the second additional data to assist in the converting.

32. The method of claim 31, wherein,
the first additional data and the second additional data include phone number information.

33. The method of claim 31, wherein,
the converting includes having a user speak the spelling of at least part of the text.

34. A method for developing the at least one speaker dependent spoken word recognizers that can use stored speaker dependent spoken words from other the at least one speaker dependent spoken word recognizers, the method comprising:
identifying stored speaker independent representations of the at least one speaker dependent spoken word associated with a first speaker independent the at least one speaker dependent spoken word recognizer, where at least some of the stored speaker independent representations of the at least one speaker dependent spoken word are created by providing at least one speaker dependent spoken word of speaker dependent representations of spoken words to the first speaker independent the at least one speaker dependent spoken word recognizer; and providing a second speaker independent the at least one sneaker dependent spoken word recognizer that can use the stored speaker independent representations of the at least one speaker dependent spoken word associated with the first speaker independent the at least one speaker dependent spoken word recognizer; and, communicating the stored speaker independent representations of speech from the first speaker independent speech recognizer to the second speaker independent speech recognizer for use in recognizing speaker dependent representation of speech by the second speaker independent speech recognizer.

35. The method of claim 34, wherein, the first speaker independent the at least one speaker dependent spoken word recognizer uses a first type of speaker independent representation of the at least one speaker dependent spoken word;

the second speaker independent the at least one speaker dependent spoken word recognizer uses a second type of speaker independent representation of the at least one speaker dependent spoken word; and to recognize speaker dependent spoken words, the second speaker independent the at least one speaker dependent spoken word recognizer uses the stored speaker independent representations of the at least one speaker dependent spoken word associated with the first speaker independent the at least one speaker dependent spoken word recognizer by converting the stored speaker independent representations of the at least one speaker dependent spoken word associated with the first speaker independent the at least one speaker dependent spoken word recognizer into a type compatible with the second speaker independent the at least one speaker dependent spoken word recognizer.

36. A method for developing the at least one speaker dependent spoken word recognizers that can provide stored speaker dependent spoken words to other the at least one speaker dependent spoken word recognizers, the method comprising:

providing a first speaker independent the at least one speaker dependent spoken word recognizer that creates speaker independent representations of the at least one speaker dependent spoken word from speaker dependent spoken words; and communicating speaker independent representations of speech from the first speaker independent speech recognizer to a second speaker independent the at least one speaker dependent spoken word recognizer for use of the speaker independent representations of the at least one speaker dependent spoken word for recognizing speaker dependent spoken words.

37. The method of claim 36, wherein, the first speaker independent the at least one speaker dependent spoken word recognizer uses a first type of speaker independent representation of the at least one speaker dependent spoken word;

the second speaker independent the at least one speaker dependent spoken word recognizer uses a second type of speaker independent representation of the at least one speaker dependent spoken word; and to recognize speaker dependent spoken words, the second speaker independent the at least one speaker dependent spoken word recognizer uses the stored speaker independent representations of the at least one speaker dependent spoken word associated with the first speaker independent the at least one speaker dependent spoken word recognizer by converting the stored speaker independent representations of the at least one speaker dependent spoken word associated with the first speaker independent the at least one speaker dependent spoken word recognizer into a type compatible with the second speaker independent the at least one speaker dependent spoken word recognizer.

* * * * *